United States Patent [19]

Thackrey

[11] 4,165,858

[45] Aug. 28, 1979

[54] GATE VALVE STRUCTURE

[76] Inventor: James D. Thackrey, 13852 Dall La., Santa Ana, Calif. 92705

[21] Appl. No.: 591,777

[22] Filed: Jun. 30, 1975

[51] Int. Cl.² ........................................... F16K 25/00
[52] U.S. Cl. ................................... 251/168; 251/194
[58] Field of Search ............... 251/167, 168, 169, 195, 251/201, 204, 194, 163

[56] References Cited

U.S. PATENT DOCUMENTS

| | | | |
|---|---|---|---|
| 1,705,481 | 3/1929 | Karnath | 251/167 |
| 2,879,798 | 3/1959 | Anderson | 251/168 X |
| 2,919,885 | 1/1960 | Daigle | 251/163 X |
| 2,934,310 | 4/1960 | Kinney | 251/163 |
| 2,977,086 | 3/1961 | Heinen | 251/167 |
| 3,626,498 | 12/1971 | Rihm | 251/163 X |
| 3,854,696 | 12/1974 | Keyes | 251/163 |

*Primary Examiner*—Harold W. Weakley
*Attorney, Agent, or Firm*—William C. Babcock

[57] ABSTRACT

A gate valve in which a threaded movable rod supports a cam that serves as a mounting for first and second floating valve plates that are disposed back to back, which valve plates when the cam is in a first position may be moved adjacent to first and second valve seats. The rod at all times has a portion thereof encircled by a cylindrical sleeve. The sleeve has at least one slot therein defined by first and second legs that are angularly disposed relative to one another. The sleeve also has guide means therein to prevent the first and second valve plates from pivoting from positions where they are substantially parallel to the first and second valve seats. A protuberance is secured to the rod and engages the slot. When the protuberance is in the first leg of the slot the first and second valve plates are in first positions and may be moved into and out of the path of flow of fluid through the valve. However, upon the rod being moved to the extent that the protuberance is in the second leg, the first and second valve plates are not only disposed in a fluid flow obstructing position but are forced into pressure sealing contact with the first and second valve seats. The sleeve serves the dual function of preventing pivotal movement of the first and second valve plate, as well as in conjunction with the protuberance and rod in moving the first and second valve plates into and out of sealing contact with the first and second valve seat.

4 Claims, 13 Drawing Figures

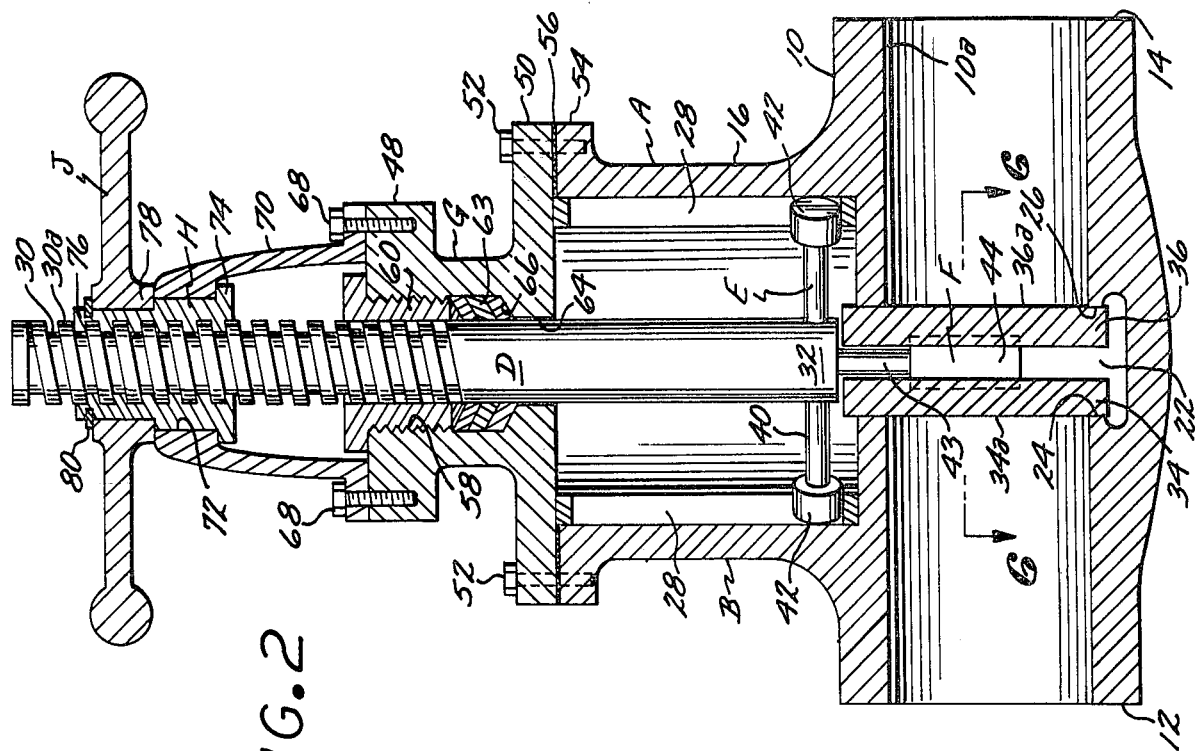
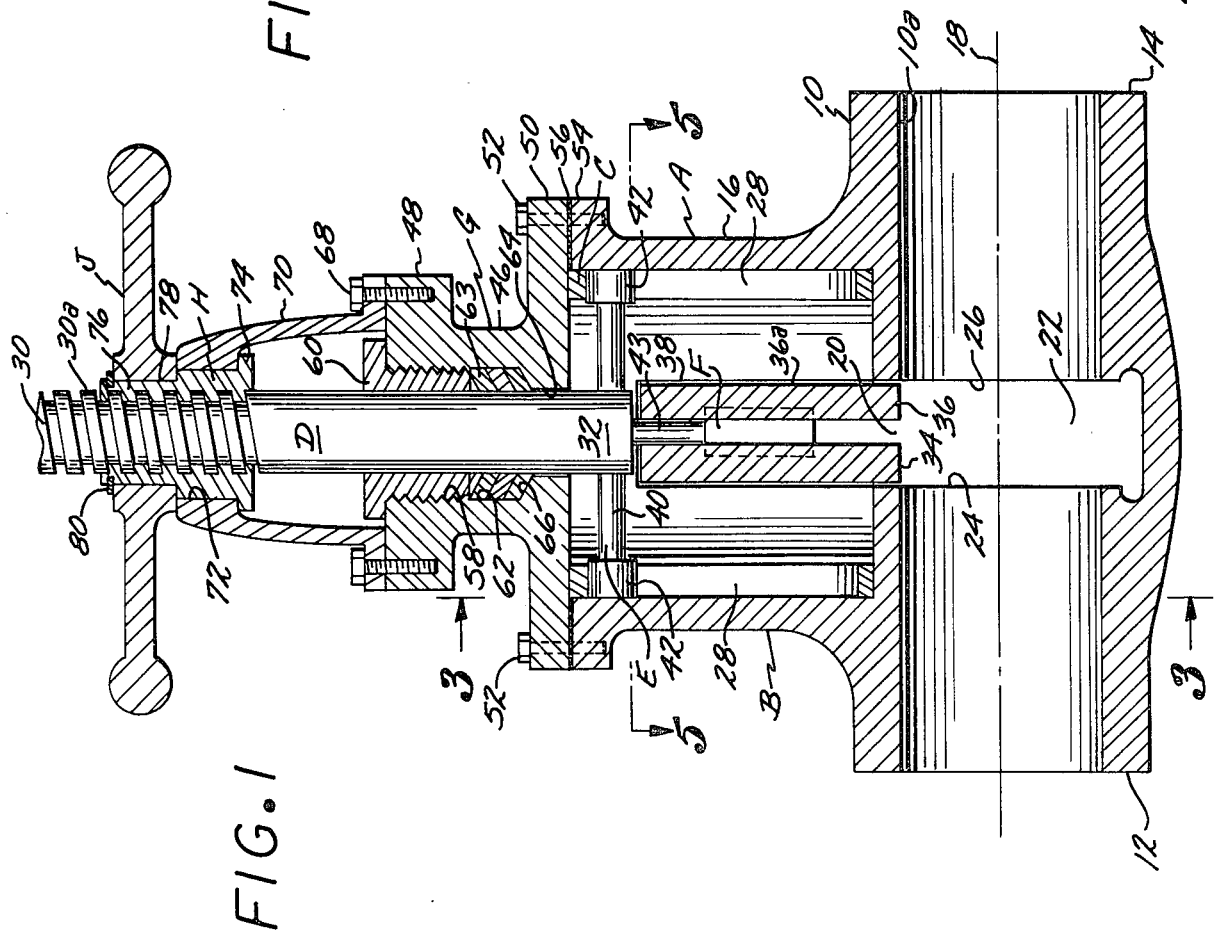

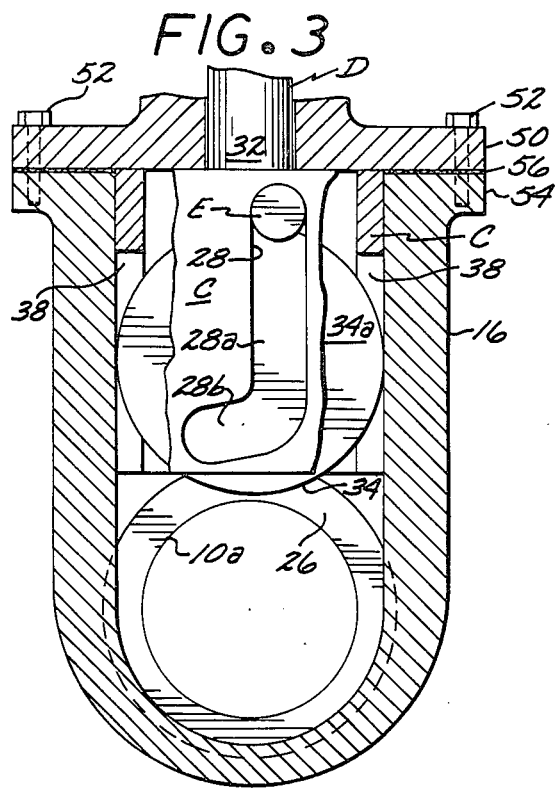
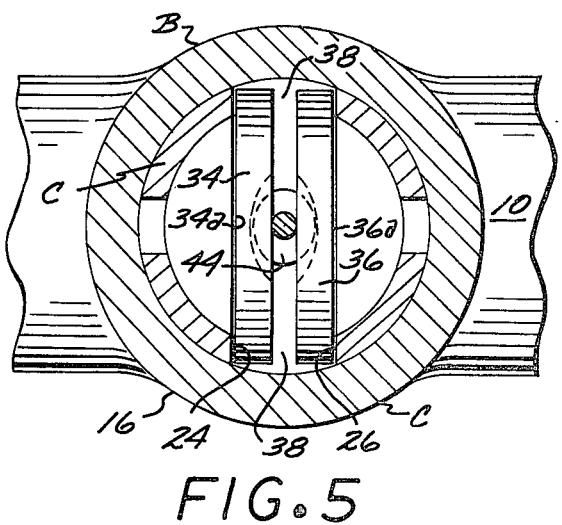
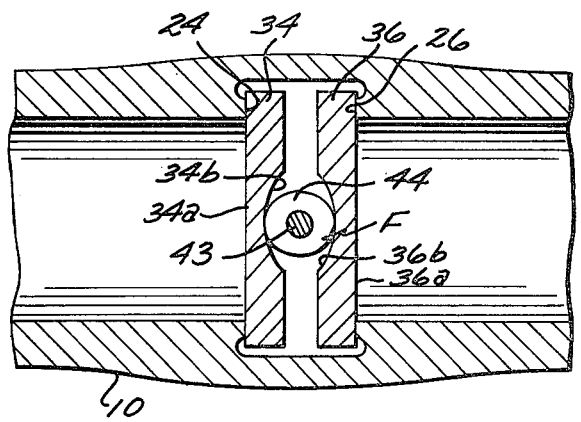
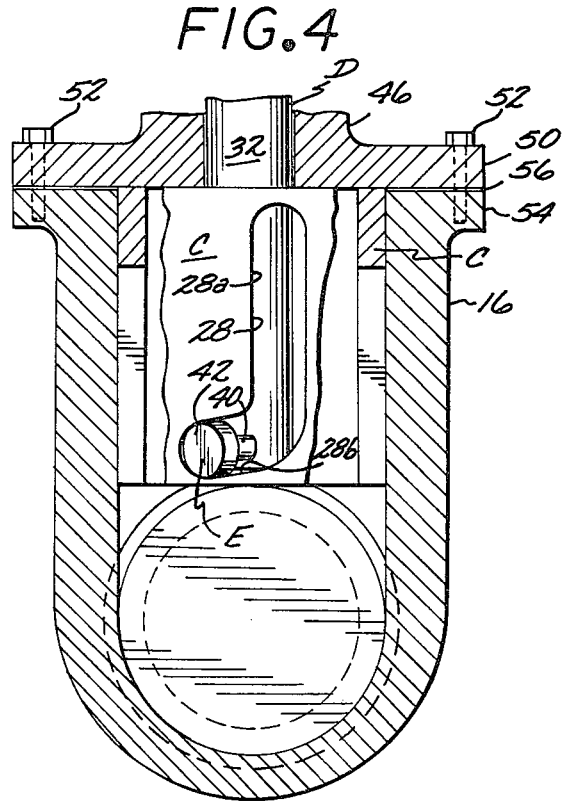
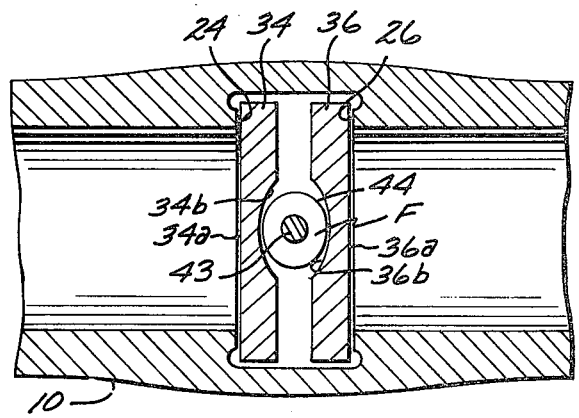

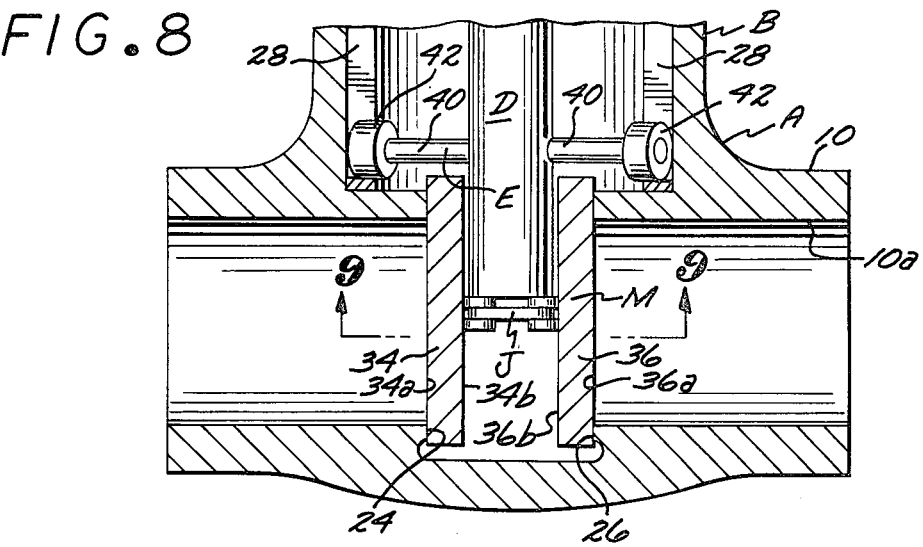
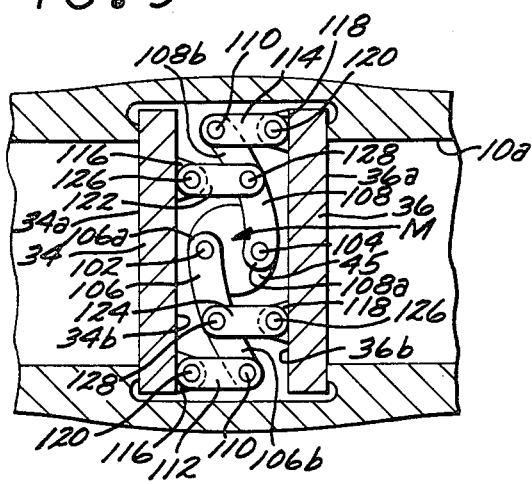
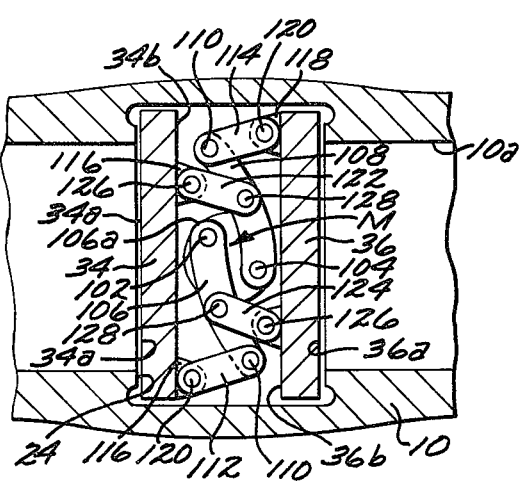
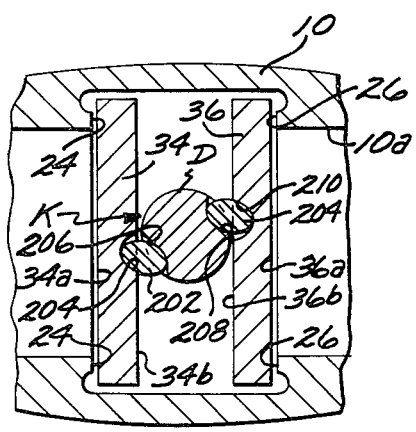
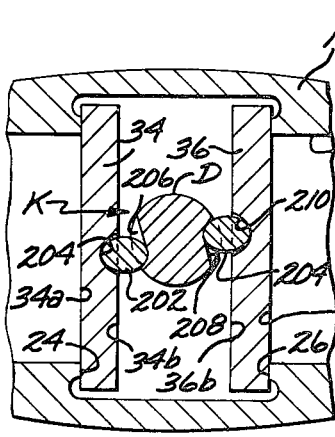
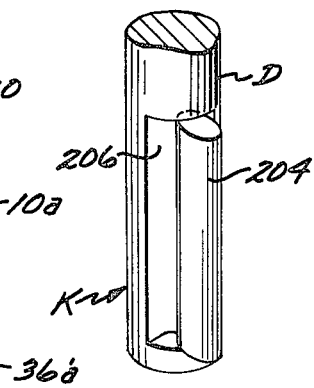

GATE VALVE STRUCTURE

BACKGROUND OF THE INVENTION

1. Field of the Invention

A gate valve structure.

2. Description of the Prior Art

In the past, various types of gate valve structures have been devised and used. However, the major portion of such prior art valves have the operational disadvantages that an excessive force is required to open and close the same, and to the extent that it is not uncommon for one of these valves to become stuck in a partially open position.

A primary object of the present invention is to provide a gate valve that will minimize the force required to open and close the same by eliminating substantial interaction between the fluid forces on the gate and the mechanical elements which convert torque into a gate traveling force, and by so doing permit an operator to completely open or close the valve of the present invention in an emergency.

Another object of the invention is to provide a gate valve that is of substantially simpler structure than previously available gate valves, and one that minimizes the machining operation required in the fabrication thereof.

A still further object of the invention is to provide a gate valve in which the main gate chamber thereof may be smaller in its maximum dimension than is possible with prior art valves, and one that may be smaller and lighter than such devices but yet serve the same functions.

Yet another object of the invention is to supply a gate valve in which the machining operations thereon may be more conveniently performed than on prior art valves due to easier accessability thereto, and one that reduces the extent and cost of seal face lapping.

SUMMARY OF THE INVENTION

The gate valve of the present invention includes a housing that has a first cylindrical portion with first and second ends, and the inner surface of which first portion defines a fluid passage. The housing also includes a second cylindrical portion that extends outwardly from the first portion intermediate the first and second ends of the latter. A transverse opening in the first cylindrical portion within the confines of the second cylindrical portion is in communication with a transversely aligned recess formed in the inner surface of the first cylindrical portion, with the transverse surfaces on the first portion that defines the opening and recess and are normal to the direction of flow serving as first and second valve seats.

A cylindrical sleeve is supported in a nonrotatable position in the second cylindrical portion, with the sleeve having at least one first slot therein that includes a first leg normally disposed to a center line of the first portion, and a second leg that is disposed at greater than a ninety degree angle relative to the first leg, and the sleeve further including two oppositely disposed second slots that are transversely aligned with the first opening and recess.

A rod having first and second end portions is provided, with threads being defined on the first end portion, and the rod having the second end portion situated within the sleeve. First means are mounted on the rod that extend outwardly therefrom and movably engage the slot. A cam is supported from the second end portion of the rod, with the cam occupying a first position when the first means is in the first leg of the first slot, and a second position after the first means has entered the second leg of the first slot.

First and second floating valve plates are supported back to back by the cam, with first and second valve plates having outwardly disposed first faces that are so spaced that the first and second valve plates may move into the first portion through the transverse opening therein when the cam is in the first position. The first faces of the first and second valve plates are forced into pressure sealing contact with the first and second valve seat when the cam has moved completely into the second position. Second means are provided on the part of the second cylindrical portion most outwardly disposed from the first portion to sealingly engaging the rod. An internally threaded member is provided that rotatably engages the threads on the rod and is held at a fixed spacing relative to the valve housing. Third means are provided for rotating the internally threaded member relative to the rod to alternately move the rod in opposite directions and the cam between first and second positions, with the first and second valve plates when the cam is in the first position capable of being disposed substantially within the second portion of the housing.

BRIEF DESCRIPTION OF THE DRAWING

FIG. 1 is a longitudinal cross-sectional view of the gate valve structure, with the first and second valve plate in a first position;

FIG. 2 is the same view as shown in FIG. 1, but with the valve plates in pressure sealing contact with first and second valve seats;

FIG. 3 is a transverse cross-sectional view of the valve structure, with a protuberance that extends from the rod engaging a first leg of the first slot;

FIG. 4 is the same transverse view as shown in FIG. 3, but with the protuberance in engagement with a second leg of the first slot;

FIG. 5 is a longitudinal cross-sectional view of the valve structure, with the cam supported from the threaded rod occupying a first position;

FIG. 6 is a longitudinal cross-sectional view of the valve structure with the cam in a second position and forcing the first and second valve plate into sealing contact with the first and second valve seats; and FIG. 7 is the same view as shown in FIG. 6, but with the cam in a first position in which the first and second valve plates occupy first positions out of sealing contact with first and second valve seats.

FIG. 8 is a fragmentary longitudinal cross sectional view of the valve and illustrating a first alternate mechanism for moving the first and second valve plates into closing positions when the actuating rod is rotated;

FIG. 9 is a transverse cross sectional view of the valve plates and first alternate mechanism taken on the line 9—9 of FIG. 8 with the valve plates in a closed position;

FIG. 10 is the same view as shown in FIG. 8 but with the first alternate mechanism and valve plates in position where the plates may be moved upwardly and downwardly in the valve body;

FIG. 11 is a transverse cross sectional view of the valve plates and a second alternate mechanism for moving the valve plates away from one another, with the mechanism in this figure being so disposed that the valve plates may be moved upwardly or downwardly in the valve body;

FIG. 12 is the same view as shown in FIG. 11, but with the valve plates in closed positions; and FIG. 13 is a perspective view of the second alternate mechanism.

DESCRIPTION OF THE PREFERRED EMBODIMENT

The gate valve A as may best be seen in FIGS. 1 and 2 includes a housing B. The housing B includes a first cylindrical portion 10 that has a first end 12 and second end 14. The housing B includes a second cylindrical portion 16, which second portion is normally disposed to the center line 18 of first portion 10.

A transverse opening 20 is formed in first portion 10 within the confines of the second portion 16 as may be seen in FIG. 1, and this second opening being in communication with a recess 22 formed in the interior surface 10a of the first portion 10. The transverse surfaces that define the first opening 20 and recess 22 are normal to center line 18 and serve as first and second valve seats 24 and 26 respectively, as shown in FIG. 1. A cylindrical sleeve C is situated within the confines of the second housing portion 16 and is held in a non-rotatable position therein by conventional means (not shown). The sleeve C has two opposing slots 28 defined therein, which slots each include a first leg 28a that is normally disposed to the center line 18, and a second leg 28b that is connected to the first leg 28 and angularly disposed thereto sustaining an angle of greater than ninety degrees with the first leg. A rod D is provided as may be seen in FIGS. 1, 2 and 3, which rod has a first end portion 30 and second end portion 32, with threads 30a being formed on the first end portion. The rod D as may best be seen in FIGS. 3 and 4 is illustrated as having two protuberances E projecting outwardly from opposite sides thereof that are at all times in movable engagement with slots 28.

In FIGS. 1, 2, 6 and 7 it will be seen that a cam F is supported from (or formed as a part of) the second end portion 32 of rod D. First and second circular valve plates 34 and 36 36 are which valve plates have outwardly disposed faces 34a and 36a as best seen in FIGS. 1 and 2 and the valve plates being supported in a floating position by cam F. An assembly G is mounted on the free end portion of the second housing portion 16 as shown in FIGS. 1 and 2 that sealingly engages the rod 32 as the latter rotates. An internally threaded member H is supported at a fixed distance relative to the assembly G, with the member being rotated by suitable means such as a handle J secured thereto as shown in FIGS. 1 and 2. In large valves the member H will be rotated by a power driven operator of conventional design (not shown).

The valve A is placed in a closed position, when the handle J is rotated in an appropriate direction. The internal threaded member H rotates concurrently with handle J relative to the threads 30a. By such rotation of member H, the rod 32 may move the first and second valve plates 34 and 36 downwardly through the opening 20, and the valve plates 34 and 36 remaining in the position relative to one another as shown in FIG. 7 until the protuberances E enter the second legs 28b of first slots 28. The second legs 28a extend in opposite directions. As the protuberances E enter the second legs 28b, the rod 32 has been moved downwardly a sufficient distance to place the first and second valve plates 34 and 36 adjacent the first and second valve seats 24 and 26. Entry of the protuberances E into the second legs 28b results in rotation of the rod 32 and the cam assembly F to force the valve plates 34 and 36 into pressure sealing engagement with the first and second valve seats 24 and 26.

When it is desired to move the first and second valve plates 34 and 36 from the closing position shown in FIG. 2 to that shown in FIG. 1, the internally threaded member H is rotated in a second direction, with the protuberances E now moving upwardly in the second legs 28b, and ultimately entering the first legs 28a. Concurrent pivotal movement of the cam assembly F takes place to dispose the first and second valve plates 34 and 36 in the position relative to one another as shown in FIG. 7 where they may be moved upwardly or downwardly through the opening 20 into or out of the confines of the second portion 16.

In FIG. 5 it will be seen that the sleeve C has a pair of oppositely disposed slots 38 therein that prevent the first and second valve plates 34 and 36 from pivoting on the cam assembly F due to fluid pressure to which they may be subjected in the opening or closing operation.

The detailed structure of the invention is as follows. The protuberances E as may best be seen in FIG. 4 includes pins 40 that extend outwardly in opposite directions from the shaft 32 and have rollers 42 rotatably supported on the outer ends thereof. The cam assembly F includes a stem 43 that depends from the second end portion 32 of rod D, and supports an oval cam 44 on the lower end thereof. The cam 44 when in the second position as shown in FIG. 6 slidably engages concave recesses 34b and 36b formed in second faces of the first and second valve plates 34 and 36.

The second means G as may be seen in FIG. 1 includes a bonnet 46 that has a first flange 48 on the upper end thereof and a second flange 50 on the lower end. A number of circumferentially spaced bolts 52 extend through a second flange 50 to engage tapped bores formed in a third flange 54 that is situated on the upper part of a second housing portion 16. A gasket 56 is for sealing purposes and disposed between the adjacent surfaces of the second and third flanges 50 and 54.

First flange 48 of bonnet 46 has an internally tapped bore 58 extending downwardly therethrough that is engaged by a threaded plug 60, which plug when tightened serves to force sealing material 63 into sealing contact with the external surface of the rod D. Second flange 50 has a bore 64 extending therethrough that is in communication with bore 62, and the two bores at their junction define a body shoulder 66 against which the sealing material 63 abuts. The first flange 48 by means of a bolt 68 has a yoke 70 secured thereto that has an opening 72 formed in the upper portion thereof in which the internally threaded member H is rotatably supported.

The member H on the lower portion thereof is provided with a circular outwardly extending lip 74 to prevent the member H from moving upwardly through the opening 72. The upper portion 76 of member H is of non-circular transverse cross section and is engaged by a bore of like cross section formed in the handle J. The member H has a body shoulder 78 defined thereon on which the center portion of handle J rests. The handle is removably held on the member H by a snap ring 80 or other suitable fastening means.

A first alternate mechanism M for moving the first and second valve plates 34 and 36 to a closed position is shown in FIGS. 8, 9 and 10. When the first alternate mechanism M is used the stem 43 is eliminated from the second rod portion 32. The lower end 45 of rod D is flat and has first and second diametrically spaced pins 102 and 104 secured thereto that pivotally engage first end portions 106a and 108a of first and second links 106 and 108. The second end portions 106b and 108b of first and second links 106 and 108 are connected by pins 110 to third and fourth links 112 and 114 that are laterally spaced from one another and extend in opposite directions. The opposite ends of third and fourth links 112 and 114 are pivotally connected to first and second brackets 116 and 118 by pins 120. First and second brackets 116 and 118 are secured to the surfaces 34b and 36b of first and second valve plates 34 and 36. The first and second links 106 and 108 are slightly arcuate in shape.

A second set of brackets 116 and 118 are secured to the valve plate surfaces 34b and 36b intermediate the rod surface 45 and the first set of brackets 116 and 118 previously identified. Fifth and sixth links 122 and 124 are by pins 126 and 128 pivotally connected to the second set of brackets 116 and 118 and the first and second links 106 and 108. The balance of the gate valve A is the same as previously described.

When rod D is rotated in the appropriate direction the first alternate mechanism M moves from the first position shown in FIG. 10 to the second position illustrated in FIG. 9 where the first and second valve plates 34 and 36 are moved in to sealing engagement in surfaces 24 and 26. The first and second valve plates 34 and 36 move from the second to the first position when the direction of rotation of rod D is reversed. The first and second valve plates 34 and 36 when in the first position may be moved transversely relative to the cylindrical portion 10 of valve body B in the same manner as previously described in connection with the form of valve shown in FIGS. 1 to 7 inclusive.

A second alternate mechanism K is shown in FIGS. 11 to 13 to move the first and second valve plates 34 and 36 into sealing engagement with first and second valve seats 24 and 26 when rod D is rotated. Mechanism K includes first and second elongate members 200 and 202 of oval shaped transverse cross section. First member 202 engages a first pair of pockets 204 and 206 defined on surface 34b and the adjacent surface of rod D. Second member 204 engages a second pair of pockets 208 and 210 formed on surface 36b and the adjacent surfaces of rod D. Pockets 206 and 208 are of such shape that when rod D is rotated in an appropriate direction the first and second valve plates 34 and 36 are moved from the first position illustrated in FIG. 11 to the sealing position shown in FIG. 12 with first and second surfaces 24 and 26. When the direction of rotation of rod D is reversed, the first and second valve plates 34 and 36 move from the second position shown in FIG. 12 to the first position illustrated in FIG. 11. First and second valve plates 34 and 36 when in the first position shown in FIG. 11 may be moved transversely relative to cylindrical valve body portion 10 by transverse non-rotational movement of rod D. Such transverse non-rotational movement of rod D occurs when handle J is rotated with rollers 42 in the straight legs 28a of the slots 28.

The use and operation of the various forms of the gate valve have been described previously in detail and need not be repeated.

I claim:

1. In a gate valve of the type that includes a housing having a fluid passage extending longitudinally therethrough, first and second longitudinally spaced, transverse valve seats defined in said housing and extending outwardly from said fluid passage, first and second adjacently disposed valve plates of greater transverse area than that of said fluid passage that may be moved when in a first position transversely relative to said fluid passage to extend thereacross or to one side thereof, said first and second valve plates when extending transversely across said fluid passage capable of being moved to a second position in which they are moved away from one another and into sealing engagement with said first and second valve seats, a device for moving said first and second valve plates when in said first position to either one side of said fluid passage or to extend transversely across said fluid passage and move said first and second valve plates to and from said second position when said first and second valve plates extend transversely across said fluid passage, said device including:
    a. a rod transversely and rotatably movable relative to said housing, said rod having a first end that may be disposed in said passage;
    b. a cam that depends from said first end of said rod and movably engages first and second oppositely disposed pockets formed in adjacent faces of said first and second valve plates, said cam serving the dual function of supporting said first and second valve plates from said rod and moving said first and second valve plates from said first to said second position when said rod and cam are concurrently rotated;
    c. second means for moving said rod, cams, and first and second valve plates from a position where said first and second valve plates are to one side of said fluid passage to a position where said first and second valve plates extend transversely across said fluid passage; and
    d. third means for rotating said rod and first means in a first direction when said first and second valve plates extend transversely across said fluid passage to move said first and second valve plates to said second position where they seal with said first and second valve seats or in a second direction to allow said first and second plates to return from said second position to said first position, with said first and second plates after returning to said first position being movable to one side of said fluid passage by non-rotatable transverse movement of said rod.

2. A gate valve as defined in claim 1 in which said rod has threads formed on the portion thereof most remote from said first and second plates, and said second means is a rotatable member having an internally threaded bore that engages said threads on said rod, with said rotatable member rotating in a fixed position relative to said housing, and said rotatable member when rotated moving said rod inwardly and outwardly relative to said housing depending upon the direction of rotation of said rotatable member.

3. A gate valve as defined in claim 1 in which said third means includes:
    e. a cylindrical shell disposed at a fixed position on said housing and through which said rod extends, said shell having a slot therein that includes a first leg normal to said fluid passage and a second leg angularly disposed relative to said first leg; and f. a protuberance that extends out from said rod and movably engages said slot, with said rod and first means rotating when said rod moves with said protuberance in said second leg.

4. A gate valve as defined in claim 1 in which said first and second valve seats are so longitudinally spaced that they serve as guides to prevent said first and second valve plates separating from said cam as said first and second valve plates move between a position to one side of said fluid passage to a position where they extend transversely across said fluid passage.

* * * * *